United States Patent
El Nahas El Homsi et al.

(10) Patent No.: US 8,116,353 B2
(45) Date of Patent: Feb. 14, 2012

(54) SPREAD SPECTRUM MODULATOR AND DEMODULATOR

(75) Inventors: Hassan El Nahas El Homsi, Paris (FR); Moussa Abdi, Paris (FR); Alexandre Jard, Suresnes (FR)

(73) Assignee: Alcatel Lucent, Paris (FR)

( * ) Notice: Subject to any disclaimer, the term of this patent is extended or adjusted under 35 U.S.C. 154(b) by 344 days.

(21) Appl. No.: 12/547,541

(22) Filed: Aug. 26, 2009

(65) Prior Publication Data
US 2010/0020853 A1    Jan. 28, 2010

Related U.S. Application Data

(62) Division of application No. 10/556,573, filed as application No. PCT/FR2004/001096 on May 6, 2004, now Pat. No. 7,583,721.

(30) Foreign Application Priority Data

May 14, 2003   (FR) ...................................... 03 05796

(51) Int. Cl.
*H04B 1/00*   (2006.01)
(52) U.S. Cl. ........ 375/148; 375/130; 375/146; 375/299; 375/347; 455/101
(58) Field of Classification Search .................. 375/148, 375/299, 347, 146, 130; 455/101
See application file for complete search history.

(56) References Cited

U.S. PATENT DOCUMENTS

| | | | |
|---|---|---|---|
| 4,707,839 A | 11/1987 | Andren et al. | |
| 5,216,691 A | 6/1993 | Kaufmann | |
| 5,652,765 A | 7/1997 | Adachi et al. | |
| 5,859,870 A * | 1/1999 | Tsujimoto | 375/143 |
| 6,088,408 A | 7/2000 | Calderbank et al. | |
| 6,097,713 A | 8/2000 | Ichihara | |
| 6,097,771 A | 8/2000 | Foschini | |
| 6,154,487 A | 11/2000 | Murai et al. | |
| 6,185,258 B1 | 2/2001 | Alamouti et al. | |
| 6,317,466 B1 | 11/2001 | Foschini et al. | |
| 6,425,082 B1 | 7/2002 | Matsui et al. | |
| 6,888,809 B1 | 5/2005 | Foschini et al. | |
| 7,218,692 B2 | 5/2007 | Dabak et al. | |

(Continued)

FOREIGN PATENT DOCUMENTS

EP    0668662 A1    8/1995

(Continued)

OTHER PUBLICATIONS

Alamouti, "A Simple Transmit Diversity Technique for Wireless Communications," IEEE Journal on Selected Areas in Communications, vol. 16, No. 8, pp. 1451-1458, Oct. 1998.

(Continued)

*Primary Examiner* — Juan A Torres (74) *Attorney, Agent, or Firm* — Fay Sharpe LLP (57) ABSTRACT

A spread spectrum modulator converts input sequences composed of digital symbols into $n \geq 2$ spread-spectrum sequences. The spread spectrum modulator can generate spreading code and can combine the spreading code with the input sequences to produce the n spread spectrum sequences for transmission from n respective antennas of a radio transmitter. Each spread spectrum sequence corresponds to a sum of at least two contributions mutually shifted by a time substantially less than the duration of a symbol, each contribution being the product of a version of one of the n input sequences times the spreading code.

5 Claims, 3 Drawing Sheets

U.S. PATENT DOCUMENTS

| | | |
|---|---|---|
| 7,321,608 B2 | 1/2008 | Smaini et al. |
| 2001/0053175 A1 | 12/2001 | Hoctor et al. |
| 2002/0172293 A1 | 11/2002 | Kuchi et al. |
| 2003/0108133 A1 | 6/2003 | Richards |
| 2004/0196793 A1 | 10/2004 | Lucidarme et al. |

FOREIGN PATENT DOCUMENTS

| | | |
|---|---|---|
| EP | 0817401 A2 | 1/1998 |
| EP | 0951091 A2 | 10/1999 |
| EP | 1117197 A2 | 7/2001 |
| WO | 9914871 A1 | 3/1999 |
| WO | 9945657 A1 | 9/1999 |
| WO | 03005753 A1 | 1/2003 |
| WO | 03085856 A1 | 10/2003 |

OTHER PUBLICATIONS

ETSI TS 125 211 V3.30 (Jun. 2006) Technical Specification, "Universal Mobile Telecommunications System (UMTS); Physical Channels and Mapping of Transport Channels onto Physical Channels (FDD) (3G TS 25.211 Version 3.3.0. Release 1999)," pp. 1-43 (2000).

* cited by examiner

SPREAD SPECTRUM MODULATOR AND DEMODULATOR

This application is a divisional application of co-pending U.S. patent application Ser. No. 10/556,573, entitled SPREAD SPECTRUM MODULATOR AND DEMODULATOR, which is a Nov. 14, 2005 national stage entry of PCT Patent Application No. PCT/FR04/01096, filed May 6, 2004, which claims the benefit of French Patent Application Serial No. 0305796, filed on May 14, 2003, the disclosures of which are fully incorporated herein by reference.

BACKGROUND OF THE INVENTION

The present invention relates to transmission diversity techniques used in the field of spread spectrum radio communications. It applies in particular to radio communications with code division multiple access (CDMA).

A transmission channel between a transmitter provided with n transmission antennas and a receiver provided with m reception antennas is considered. A spreading code c(t), consisting of a periodic sequence of complex samples called "chips" of rate $f_c$, is allocated to this channel. It serves to modulate n sequences of complex symbols $s_i(t)$ ($1 \leq I \leq n$) having a symbol rate $f_s$ that is smaller than $f_c$. The ratio $SF = f_c/f_s$ is the channel spreading factor. The signal $y_j(t)$ picked up by the j-th reception antenna ($1 \leq j \leq m$) may be written:

$$y_j(t) \sum_{i=1}^{n} s_i(t)[c(t) \otimes h_{ij}(t)] + w(t) \quad (1)$$

where ⊗ designates the convolution operation, and w(t) designates the white noise and Gaussian noise. For one and the same user, the same spreading code is used on the various transmission antennas. In a CDMA system, the noise w(t) contains contributions pertaining to other users of the system.

The impulse response $h_{ij}(t)$ of the propagation channel between the i-th transmission antenna and the j-th reception antenna is conventionally estimated by the receiver by virtue of known pilot sequences transmitted respectively by the n transmission antennas. It is generally modeled as a set of p paths taking into account per pair of antennas ($p \geq 1$), the k-th path ($1 \leq k \leq p$) corresponding to a reception delay $\tau_k$ and to a complex reception amplitude $a_{ijk}$. Each propagation channel (i-th transmission antenna to j-th reception antenna) is thus associated by the receiver with a vector of p amplitudes: $A_{ij} = [a_{ij1}, a_{ij2} \ldots a_{ijp}]^T$, (the notation [.]T designates transposition).

The demodulation in a spread spectrum system consists in despreading the signal received at the level of each echo, by correlating the signal received with the spreading code. The receiver most commonly used is the "rake" receiver, in which the signal emanating from each antenna j is subjected to a filter matched to the spreading code whose output is sampled at the instants corresponding to the p paths identified. This provides a vector $Z = [z_{11} \ldots z_{1p} z_{m1} \ldots z_{mp}]^T$, where $Z_{jk}$ designates the output of the matched filter relating to antenna j, sampled with the delay $\tau_k$. Thus, at a given symbol time, the following system of equations is obtained:

$$Z = HS + N \quad (2)$$

where $$H = \begin{bmatrix} A_{11} & \cdots & A_{n1} \\ \vdots & \ddots & \vdots \\ A_{1m} & \cdots & A_{nm} \end{bmatrix}$$

is a matrix representative of the overall channel, of mp rows and n columns; $S = [s_1 \ldots s_n]^T$ is a vector containing the n symbols transmitted at the time considered from the n transmission antennas; and N is a noise vector of size mp.

The system (2) is of a form very commonly encountered in signal processing. It is easily solved by a conventional least squares estimation procedure (MMSE, "minimum mean squared error") on condition that the rank of the matrix H is at least equal to n. The MMSE solution may be written: $\hat{S}$ $$\hat{S} = (H^*H)^{-1}H^*Z \quad (3)$$

Assuming that the antennas are not perfectly correlated, the rank of the matrix H is generally equal to the minimum of the integers n and mp. The necessary and sufficient condition to be able to solve the system (2) by the MMSE procedure is then $mp \geq n$. Once this condition is satisfied, it is possible to solve the system according to the desired technique, by the MMSE procedure or by another procedure such as for example maximum likelihood sequence estimation (MLSE, this MLSE procedure may also be applied when mp<n, but it is then very unstable and sensitive to noise).

The performance of the receiver depends on the conditioning of the matrix of the channel H, which depends on the number m of reception antennas, the number p of paths and the decorrelation properties of the antennas. Correlated antennas cause poor conditioning due to the fact that the matrix H*H then has eigenvalues close to zero which disturb its inversion in the solution according to (3). In general, the designer of a radio station with multiple antennas contrives matters such that they are decorrelated, by spacing them sufficiently far apart and/or by making them radiate according to different polarities.

In the known systems with multiple inputs and multiple outputs (MIMO), i.e. with $n \geq 2$ and $m \geq 2$, one seeks to increase the accessible communication throughput for a given transmitted power, by transmitting different symbols $s_1, \ldots, s_n$ through the n transmission antennas. These symbols may be mutually correlated, if they emanate from a space-time coding, or independent. To definitely comply with the condition on the rank of the matrix H, the receiver should be equipped with at least n reception antennas. Otherwise the system (2) would be insoluble in the presence of a single path.

Examples of such MIMO systems are described in European Patent Application Publication Nos. EP 0 817 401, EP 0 951 091, and EP 1 117 197 and PCT Patent Application Publication Nos. WO 99/14871 and WO 99/45657.

SUMMARY OF THE INVENTION

An object of the present invention is to improve the performance of the transmission chain in a transmission diversity scheme with n antennas.

The invention thus proposes a spread spectrum modulator for converting n input sequences composed of digital symbols into n spread spectrum sequences in a radio transmitter, n being a number at least equal to 2. This modulator comprises a spreading code generator and means of combining the spreading code with the n input sequences so as to produce the n spread spectrum sequences for transmission from n respective antennas of the radio transmitter. According to the invention, the combining means are arranged so that each spread spectrum sequence corresponds to a sum of at least two contributions mutually shifted by a time substantially less than the duration of a symbol, each contribution being the product of a version of one of the n input sequences times the spreading code.

The above discussion shows a certain duality between the number m of reception antennas and the number p of paths. The number m generally being limited for hardware cost or bulkiness reasons (in particular in a mobile terminal), the modulator proposed has the advantage of raising the rank of the matrix H by virtue of an increase in the number of paths taken into account in the system (2). This increase results from the artificial creation of one or more additional echoes corresponding to the contributions shifted by a predefined time.

These contributions will typically have mutual shifts corresponding to the duration of one or more chips of the spreading code. A shift of a chip duration is preferred since it minimizes the lengthening of the impulse response and, in a CDMA system, the degradation of the orthogonality of the codes employed.

In an embodiment of the modulator, the increase in the number of paths is affected by filtering the transmission signal of each antenna through a filter containing at least two echoes. In order for the rank of the matrix of the overall channel to be increased, these filters must differ from one antenna to another. In particular, in a case where n=2, one of the two spread spectrum sequences corresponds to a sum of two mutually shifted identical contributions, equal to the product of one of the two input sequences times the spreading code, while the other of the two spread spectrum sequences corresponds to a sum of two mutually shifted opposite contributions, one of these two opposite contributions being equal to the product of the other of the two input sequences times the spreading code. The expression for the first filter is then $$g_1(t) = \frac{1 + \delta(t - T_C)}{\sqrt{2}},$$

where $\delta$ designates the Dirac function and $T_c$ is the chip time, while the expression for the second filter is $$g_2(t) = \frac{1 + \delta(t - T_C)}{\sqrt{2}}.$$

In a preferred embodiment of the modulator, the contributions summed with time shift to form each spread spectrum sequence are respectively obtained on the basis of distinct input sequences. Under these conditions, a symbol transmitted which benefits from one or more existing paths from a given transmission antenna also contributes to the signal transmitted from another transmission antenna. Therefore, the symbol benefits from one or more other paths. This transmission diversity of the symbol decreases its sensitivity to channel fadeouts, so that it can be detected under better conditions by the receiver.

The gain obtained may be of the order of 3 dB.

In particular, in a case where n=2 and the symbols are complex, one of the two spread spectrum sequences corresponds to a sum of a first and of a second mutually shifted contributions. While the other of the two spread spectrum sequences corresponds to a sum of a third and of a fourth mutually shifted contributions, the first contribution is the product of a first of the two input sequences times the spreading code. The second contribution is the opposite of the product of the complex conjugate of the second input sequence times the spreading code. The third contribution is the product of the second input sequence times the spreading code. The fourth contribution is the product of the complex conjugate of the first input sequence times the spreading code.

A transmission diversity of the same kind is produced in known space and time diversity schemes (STTD, "space time transmit diversity"). However, the shift between the contributions respectively transmitted by the antennas and originating from one and the same symbol in the conventional STTD scheme are shifted by a symbol time, so that this scheme does not produce additional echoes in the impulse response and affords no gain in throughput. An STTD scheme is in particular standardized within the framework of UMTS networks ("universal mobile telecommunication system"). See Section 5.3.1 of technical specification TS 25.211, "Physical channels and mapping of transport channels onto physical channels (FDD) (Release 1999)", version 3.3.0, published in June 2000 by the 3GPP (3rd Generation Partnership Project).

In another embodiment, the contributions summed to form the n spread spectrum sequences are all obtained on the basis of distinct input sequences. The modulator then utilizes the presence of the additional echo or echoes to multiply the transmission throughput over the channel.

The mutually shifted contributions are advantageously summed with a uniform distribution of power.

Provision may also be made to sum them with a power distribution determined as a function of information on a number of stations to which spreading codes have been allocated so as to receive signals originating from the radio transmitter. The distribution will generally be less uniform when many users have codes allocated, since this better preserves the orthogonality of the codes allocated to the various users.

Another aspect of the present invention pertains to a radio transmitter, comprising n transmission antennas, means of obtaining input sequences composed of digital symbols, a spread spectrum modulator as defined above for converting input sequences into n spread spectrum sequences, circuits for producing n respective radio frequency signals on the basis of the n spread spectrum sequences and means for providing respectively the n radio frequency signals to the n transmission antennas.

The invention also proposes a demodulator suitable for the reception of signals originating from such a transmitter. This demodulator serves to convert m spread spectrum sequences respectively arising from m reception antennas of a radio receiver into at least n sequences of estimations of digital symbols transmitted at a symbol rate by the transmitter, m being a number at least equal to 1, n being a number at least equal to 2 representing a number of transmission antennas of the transmitter. It comprises means for detecting propagation paths between the transmission and reception antennas, means of despreading of each of the m spread spectrum sequences with a predefined spreading code so as to produce echo components at the symbol rate, and means of combining the echo components to produce the n symbols estimation sequences. According to the invention, the echo components taken into account comprise at least two echo components for a detected path, representing associated echoes having a mutual shift by a time substantially less than the duration of a symbol.

Another aspect of the present invention pertains to a radio receiver, comprising m reception antennas, means of obtaining m respective spread spectrum sequences on the basis of the m reception antennas, and a demodulator as defined hereinabove for converting the m spread spectrum sequences into at least n sequences of estimations of digital symbols transmitted by the transmitter.

DESCRIPTION OF THE DRAWINGS

Other features and advantages of the present invention will become apparent in the description hereinbelow of non-limiting exemplary embodiments, with reference to the appended drawings, in which.

DETAILED DESCRIPTION

Interest is focused on the transmission of sequences of digital symbols $s_i$ through a spread spectrum technique. This transmission may in particular take place in a cellular radio communication system of UMTS type which uses the CDMA technique.

We consider a transmitter with n antennas and a receiver with m antennas, with $n \geq 2$ and $m \geq 1$. Often, the transmitter will form part of a base station of the cellular system with typically n=2, while the receiver will form part of a mobile terminal with typically m=1. A fixed base station is in fact better suited to the installation of multiple antennas, spaced apart mutually so as to be well decorrelated. It will nevertheless be noted that the terminal could comprise multiple antennas, for example collocated antennas with cross polarizations. Moreover, the transmitter described hereinbelow could be in the terminal and the receiver in the base station.

Figure 1:
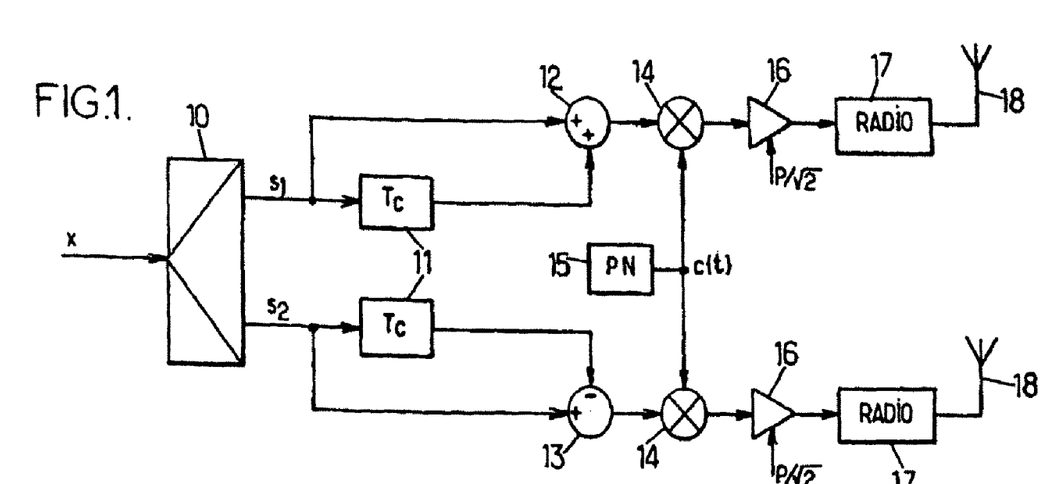
FIG. 1 is a schematic diagram of an embodiment of a radio transmitter according to the invention.

The radio transmitter represented in FIG. 1 comprises n=2 decorrelated transmission antennas 18. It transmits over a communication channel a binary sequence x destined for a receiver. A spreading code c(t) is allocated to this communication channel. The chip rate $f_c=1/T_c$ of the spreading code is 3.84 Mchip/s in the case of UMTS, the spreading factor being a power of 2 lying between 4 and 512.

The radio modulation employed is a quaternary phase shift keying (QPSK) which admits complex symbols whose real and imaginary parts modulate two quadrature carriers. A multiplexer 10 distributes the bits x of the sequence to be transmitted over the real and imaginary parts of the symbols $s_1$, $s_2$ destined for the transmission pathways on the two antennas 18. There are thus two symbols $s_1$, $s_2$ transmitted at each symbol time $T_s=1/f_s$, i.e. four bits.

To artificially duplicate the echoes which will be picked up at the receiver, a delayed version of each symbol $s_1$, $s_2$ is generated, as shown diagrammatically in FIG. 1 by the element 11 which introduces a delay of a chip time $T_c$. The delayed version of the symbol $s_1$ is added to its non-delayed version by the adder 12, thus effecting the filter $g_1(t)$ mentioned previously to within a factor $\sqrt{2}$. The delayed version of the symbol $s_2$ is deducted from its non-delayed version by the subtractor 13, thus effecting the filter $g_2(t)$ mentioned previously to within a factor $\sqrt{2}$.

The output samples from the adder 12 and from the subtractor 13 are multiplied at 14 by the spreading code c(t) of the channel delivered by a pseudorandom generator 15. The n=2 spread spectrum signals which result therefrom are multiplied by the number $P/\sqrt{2}$, as symbolized by the amplifiers 16, P being a transmission power adjustment factor specified for the pair of symbols $s_1$, $s_2$ and which is for example determined in a conventional manner by closed-loop feedback control.

The spread spectrum signals thus produced by the modulator are addressed to the radio stage 17 which executes the conventional operations of conversion to analog, filtering, QPSK modulation, power amplification, etc., serving to produce the radio signals feeding the antennas 18.

Figure 2:
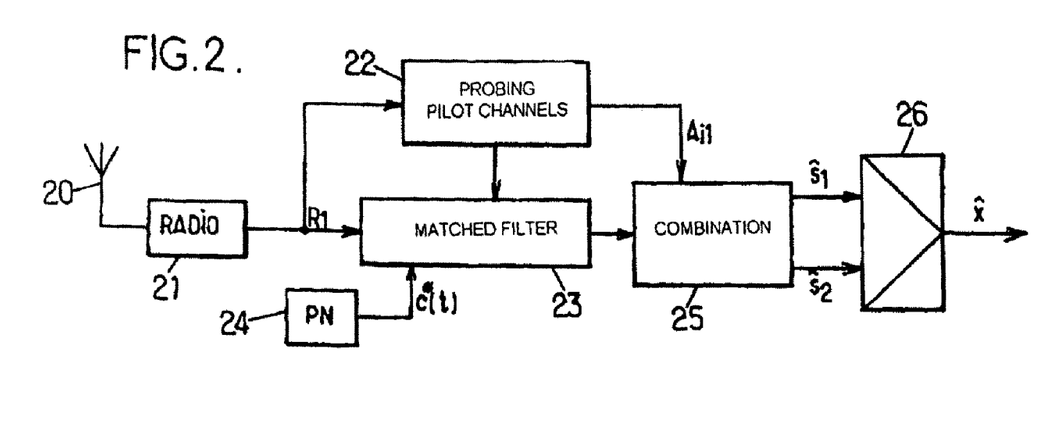
FIGS. 2 and 3 are schematic diagrams of two embodiments of a radio receiver according to the invention.

FIG. 2 shows a radio receiver with m=1 reception antenna 20, capable of communicating with a transmitter according to FIG. 1.

The radio stage 21 executes the conventional operations of amplification and of filtering of the radio signal picked up by the antenna 20, transposes it to baseband or to intermediate band and digitizes it so as to provide the spread spectrum signal $R_1$ processed by the demodulator.

The latter comprises a probing module 22 which calculates the correlations of the signal $R_1$ with beacon signals allocated respectively to the transmission antennas. In the case of downlinks (from a base station to a terminal) each antenna of the base station has a pilot channel termed CPICH ("Common Pilot Channel"), with spreading factor 256, over which is transmitted a beacon signal described in section 5.3.1 of technical specification 3 G TS 25.211, version 3.3.0, "Physical Channels and Mapping of Transport Channels onto Physical Channels (FDD)—Release 1999" published in June 2000 by 3GPP.

The probing module 22 allows the receiver to estimate the p delays associated with p propagation paths for each antenna of the transmitter and the n corresponding vectors $A_{i1}$ ($1 \leq i \leq n$). In practice, the delays are the same for the various transmission antennas, since a distance of the order of a meter between the antennas, sufficient to ensure decorrelation, represents a negligible time shift, of the order of a hundredth of the duration of a chip.

The p estimated delays are provided to a matched filter 23 which receives the spread spectrum signal $R_1$ and despreads it by convolving it with the complex conjugate $c^*(t)$ of the spreading code of the communication channel, delivered by the pseudorandom generator 24. The output of the matched filter 23 is sampled at the instants corresponding to the p estimated delays, thereby providing the mp=p first components of the vector Z (case m=1). According to the invention, the output of the matched filter 23 is moreover sampled at the instants corresponding to the p estimated delays plus a chip time, thereby providing mp=p additional components of the vector Z.

A module 25 combines the components of the vector Z, taking account of weighting coefficients deduced from the vectors $A_{i1}$ estimated by the probing module 22. The combination restores the estimates $\hat{s}_1$, $\hat{s}_2$ of the transmitted symbols $s_1$, $s_2$, which the demultiplexer 26 sorts so as to construct the estimated binary sequence $\hat{x}$.

The combination module 25 may in particular determine $$\hat{S} = \begin{bmatrix} \hat{s}_1 \\ \hat{s}_2 \end{bmatrix}$$

according to the conventional MMSE procedure:

$$\hat{S} = (\Phi^*\Phi)^{-1}\Phi^*Z \qquad (4)$$

given that, owing to the additional echoes introduced artificially (positioned at the end of the vector Z), the system to be solved has become:

$$Z = \Phi S + N \qquad (5)$$

When the transmitter is in accordance with FIG. 1, the matrix Φ of expressions (4) and (5) is given by:

$$\Phi = \frac{1}{\sqrt{2}} \begin{bmatrix} A_{11} & A_{21} \\ A_{11} & -A_{21} \end{bmatrix} \quad (6)$$

In the case of FIG. 2, where m=1, when a single propagation path is identified by the module 22 (p=1, $A_{11}$=[$a_{111}$], $A_{21}$=[$a_{211}$]), we see that the conventional system (2) is insoluble since the number of rows, and hence the rank, of the matrix H=[$a_{111}$ $a_{211}$] is smaller than the number n of antennas of the transmitter. However, on account of having introduced the additional artificial echoes to the transmitter it becomes possible to surmount this problem by carrying out the estimations according to (4).

If two propagation paths are identified by the module 22

$$\left( p=2, A_{11} = \begin{bmatrix} a_{111} \\ a_{112} \end{bmatrix}, A_{21} = \begin{bmatrix} a_{211} \\ a_{212} \end{bmatrix} \right),$$

system (2) will generally be soluble since the rank of the matrix $$H = \begin{bmatrix} a_{111} & a_{211} \\ a_{112} & a_{212} \end{bmatrix}$$

is generally mp=2=n. On account of having introduced the additional artificial echoes to the transmitter it becomes possible here to improve, in the presence of fading, the conditioning of the matrix Φ used in the combination according to (4).

Figure 3:
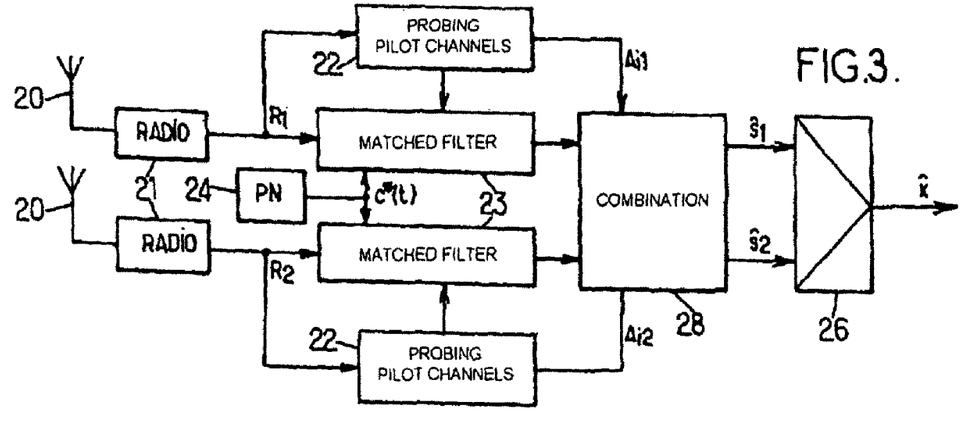

The radio receiver illustrated by FIG. 3 possesses m=2 decorrelated reception antennas 20, thereby ensuring that the system (2) is always soluble. Here again, the artificial increase in the number of paths generally improves the conditioning of the matrix of the channel.

Each antenna 20 is associated with a reception chain 21-23 identical to that described with reference to FIG. 3. The combination module 28 determines the two symbols estimated as $\hat{s}_1$, $\hat{s}_2$ according to (4), with:

$$\Phi = \frac{1}{\sqrt{2}} \begin{bmatrix} A_{11} & A_{21} \\ A_{12} & A_{22} \\ A_{11} & -A_{21} \\ A_{12} & -A_{22} \end{bmatrix} \quad (7)$$

Figure 4:
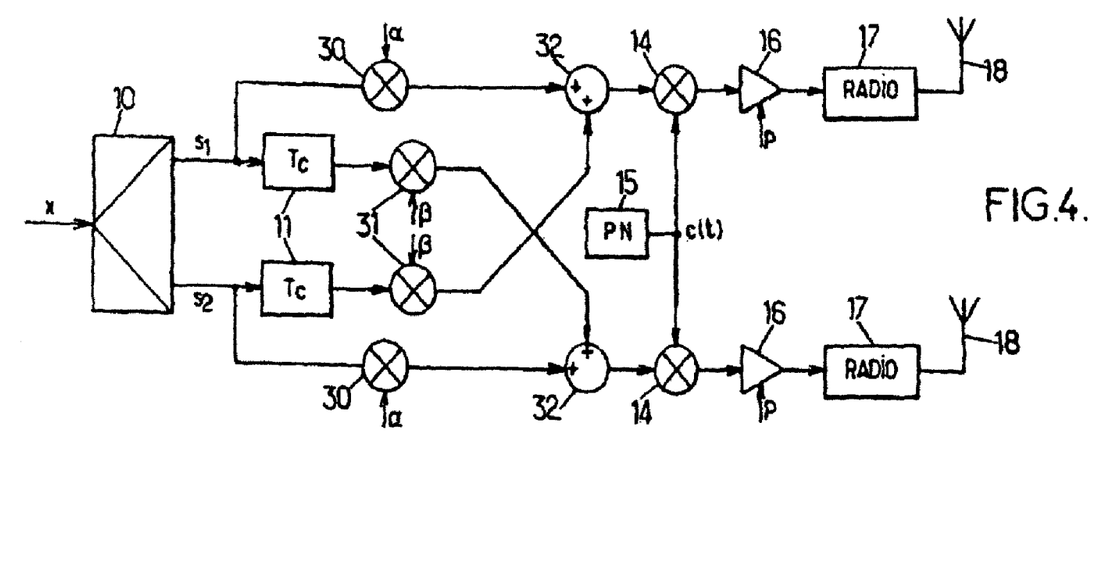
FIGS. 4 to 6 are schematic diagrams of variant embodiments of the radio transmitter according to the invention.
Figure 5:
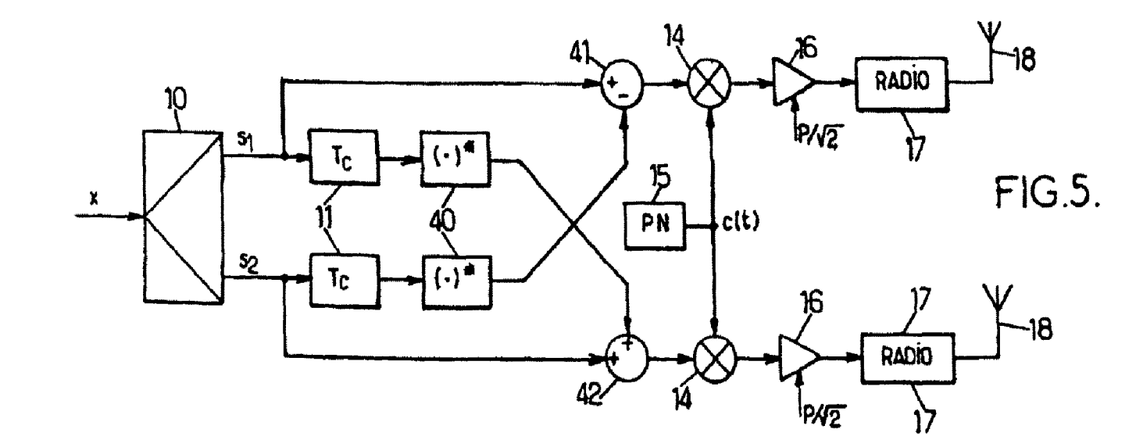

FIGS. 4 and 5 show preferred variants of the transmitter of FIG. 1, in which the processing applied to introduce additional echoes is not a simple filtering of the symbols destined for the transmission antennas. In the artificially created echo, the symbols $s_1$, $s_2$ pertaining to the two antennas are permuted, so that the spatial diversity is harnessed.

In the case of FIG. 4, after having respectively transmitted α·$s_1$ and α·$s_2$ on the n=2 antennas, we retransmit β·$s_2$ and β·$s_1$, for example $T_c$ later, so that we carry out a permutation of symbols and a weighting of the echoes by coefficients α and β such that $|\alpha|^2+|\beta|^2=1$. The weighting by the coefficient α is applied to the symbols by the multipliers 30, and the weighting by the coefficient β is applied to the delayed symbols by the multipliers 31. Two adders 32 respectively sum the two contributions for the two transmission antennas.

The matrix Φ used by the combination module of the receiver according to relation (4) then becomes:

$$\Phi = \begin{bmatrix} \alpha A_{11} & \alpha A_{21} \\ \beta A_{21} & \beta A_{11} \end{bmatrix} \quad (8)$$

in the case of a receiver with m=1 antenna (FIG. 2), and:

$$\Phi = \begin{bmatrix} \alpha A_{11} & \alpha A_{21} \\ \alpha A_{12} & \alpha A_{22} \\ \beta A_{21} & \beta A_{11} \\ \beta A_{22} & \beta A_{12} \end{bmatrix} \quad (9)$$

in the case of a receiver with m=2 antennas (FIG. 3).

The weighting may be uniform, as in the case of FIG. 1, i.e.

$$|\alpha| = |\beta| = \frac{1}{\sqrt{2}}.$$

It may also vary as a function of the number of codes allocated in CDMA. The duplication of the echoes causes the strict orthogonality of the codes employed to be lost, so that it is advantageous to unbalance the weighting (α tends to 1 and β to 0) when the number of codes allocated to users increases.

In order to facilitate the demodulation at the receiver level, the permutation of the symbols may involve an operation of complex conjugation of the symbols. This is what is carried out in the modulator of FIG. 5, which retransmits $$-\frac{s_2}{\sqrt{2}} \text{ and } \frac{s_1}{\sqrt{2}}$$

as artificial echoes (uniform weighting). The complex conjugates of the delayed symbols are obtained by respective modules 40. A subtractor 41 calculates the difference $s_1(t)-s_2^*(t-T_c)$, while an adder 42 calculates the sum $s_2(t)+s_1^*(t-T_c)$. The remainder of the modulator is similar to that of FIG. 1.

The matrix Φ used by the combination module of the receiver according to relation (4) then becomes:

$$\Phi = \frac{1}{\sqrt{2}} \begin{bmatrix} A_{11} & A_{21} \\ \dot{A}_{21} & -\dot{A}_{11} \end{bmatrix} \quad (10)$$

in the case of a receiver with m=1 antenna (FIG. 2), and:

$$\Phi = \frac{1}{\sqrt{2}} \begin{bmatrix} A_{11} & A_{21} \\ A_{12} & A_{22} \\ \dot{A}_{21} & -\dot{A}_{11} \\ \dot{A}_{22} & -\dot{A}_{12} \end{bmatrix} \quad (11)$$

in the case of a receiver with m=2 antennas (FIG. 3).

We then obtain the important advantage that the matrix $\Phi$ of the channel is orthogonal:

$$(\Phi^*\Phi)=(\Sigma_{i,j}A_{ij}A_{ij})1_n \qquad (12)$$

where $1_n$ designates the identity matrix of size n.times.n. Under these conditions, the MMSE and MLSE procedures are equivalent $$\left(\hat{S}=\frac{1}{\Sigma_{i,j}A_{i,j}A_{i,j}}\phi*Z,\right.$$

and the required calculation complexity is reduced.

It is also possible to transmit other symbols on the various replicas so as to increase the throughput by virtue of the multiplication of the paths. In this case, the contributions summed to form the n spread spectrum sequences are all obtained on the basis of distinct input sequences. For example, we transmit respectively $$\frac{s_1}{\sqrt{2}} \text{ and } \frac{s_2}{\sqrt{2}}$$

on the n=2 antennas, then $$\frac{s_3}{\sqrt{2}} \text{ and } \frac{s_4}{\sqrt{2}}$$

and so on. There are then 2n sequences of symbols $s_1$, $s_2$, $s_3$, $s_4$ input to the modulator.

Figure 6:
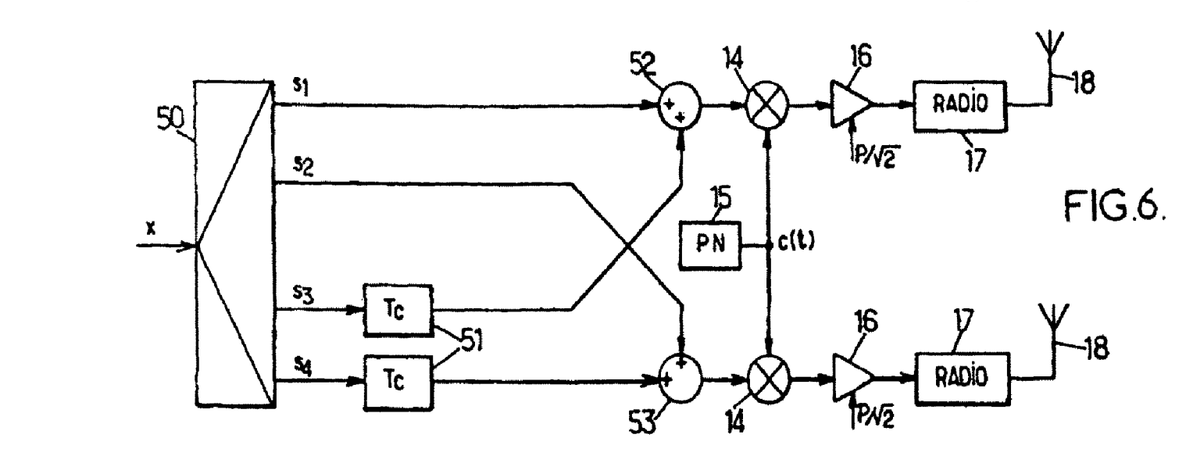

This is what is illustrated in FIG. 6, where the input multiplexer 50 produces 2n=4 sequences of quaternary symbols. Four symbols $s_1$, $s_2$, $s_3$, $s_4$ are thus transmitted in a symbol time by means of n=2 antennas. The symbols $s_3$ and $s_4$ are delayed by a chip time by the element 51. A first adder 52 calculates the sum $s_1(t)+s_3(t-T_c)$, while a second adder 53 calculates the sum $s_2(t)+s_4(t-T_c)$. The remainder of the modulator is similar to that of FIG. 1.

The corresponding demodulator, whose number of antennas m must then be at least equal to n, detects the p real paths with the aid of the pilot channel, and assigns these p paths to the symbols $s_1$ and $s_2$ and the same p paths shifted by a chip time to the symbols $s_3$ and $s_4$.

The matrix $\Phi$ used by the combination module of the receiver with m=2 antennas to estimate $$\hat{S} = \begin{bmatrix} \hat{s}_1 \\ \hat{s}_2 \\ \hat{s}_3 \\ \hat{s}_4 \end{bmatrix}$$

according to relation (4) then becomes:

$$\Phi = \frac{1}{\sqrt{2}}\begin{bmatrix} A_{11} & A_{21} & 0 & 0 \\ A_{12} & A_{22} & 0 & 0 \\ 0 & 0 & A_{11} & A_{21} \\ 0 & 0 & A_{12} & A_{22} \end{bmatrix} \qquad (13)$$

The monitoring of the modulation and demodulation process may advantageously take account of the information on the richness of the channel in terms of multipaths, i.e. on the number p, so as to decide whether or not the artificial generation of additional paths is to be applied.

Such information may for example be provided by the mobile terminal and/or by the base station in the manner described in PCT Patent Application Publication No. WO 03/005753. It may also be summarized through measurements of variance as described in French Patent Application No. 02 04251, filed Apr. 5, 2002 (see French Patent Application Publication No. 2828279, published Sep. 24, 2004).

By way of example, the modulator and the demodulator may be controlled jointly so that they operate: i) in the manner described previously, with artificial increase in the number of echoes, when the propagation channel generates only a single significant path (p=1) by itself; and ii) in a conventional manner in the presence of multipaths (p>1).

This makes it possible to reserve the use made of the calculation resources of the receiver for cases where the gain afforded by the procedure is largest.

We claim:

1. A demodulator for converting m spread spectrum sequences respectively arising from m reception antennas of a radio receiver into at least n sequences of estimations of digital symbols transmitted at a symbol rate by a transmitter m being a positive integer number at least equal to 1, n being a positive integer number at least equal to 2 representing a number of transmission antennas of the transmitter, the demodulator comprising:
   means for detecting propagation paths between the transmission and reception antennas;
   means for despreading of each of the m spread spectrum sequences with a predefined spreading code so as to produce echo components at the symbol rate; and
   means for combining the echo components to produce the symbols estimation sequences, wherein the echo components comprise at least two echo components for a detected path, representing associated echoes having a mutual shift by a time substantially less than the duration of a symbol.

2. The demodulator as claimed in claim 1, wherein the associated echoes in respect of a detected path are mutually shifted by the duration of a chip of the spreading code.

3. A radio receiver, comprising:
   m reception antennas, m being a positive integer number at least equal to 1;
   means for obtaining m respective spread spectrum sequences on the basis of the m reception antennas; and
   a demodulator for converting the m spread spectrum sequences into at least n sequences of estimations of digital symbols transmitted at a symbol rate by a transmitter, n being a positive integer number at least equal to 2 representing a number of transmission antennas of the transmitter, the demodulator comprising:
      means for detecting propagation paths between the transmission and reception antennas;
      means for despreading of each of the m spread spectrum sequences with a predefined spreading code so as to produce echo components at the symbol rate; and
      means for combining the echo components to produce the symbols estimation sequences, wherein the echo components comprise at least two echo components for a detected path, representing associated echoes having a mutual shift by a time substantially less than the duration of a symbol.

4. A cellular radio communication base station, comprising:
a radio receiver, comprising:
m reception antennas, m being a positive integer number at least equal to 1, means for obtaining m respective spread spectrum sequences on the basis of the m reception antennas; and
a demodulator for converting the m spread spectrum sequences into at least n sequences of estimations of digital symbols transmitted at a symbol rate by a transmitter, n being a positive integer number at least equal to 2 representing a number of transmission antennas of the transmitter, the demodulator comprising:
means for detecting propagation paths between the transmission and reception antennas; means for despreading of each of the m spread spectrum sequences with a predefined spreading code so as to produce echo components at the symbol rate; and
means for combining the echo components to produce the symbols estimation sequences, wherein the echo components comprise at least two echo components for a detected path, representing associated echoes having a mutual shift by a time substantially less than the duration of a symbol.

5. A cellular telecommunication terminal, comprising:
a radio receiver, comprising:
m reception antennas, m being a positive integer number at least equal to 1;
means for obtaining m respective spread spectrum sequences on the basis of the m reception antennas; and
a demodulator for converting the m spread spectrum sequences into at least n sequences of estimations of digital symbols transmitted at a symbol rate by a transmitter, n being a positive integer number at least equal to 2 representing a number of transmission antennas of the transmitter, the demodulator comprising:
means for detecting propagation paths between the transmission and reception antennas;
means for despreading of each of the m spread spectrum sequences with a predefined spreading code so as to produce echo components at the symbol rate; and
means for combining the echo components to produce the symbols estimation sequences, wherein the echo components comprise at least two echo components for a detected path, representing associated echoes having a mutual shift by a time substantially less than the duration of a symbol.

* * * * *